US008784567B1

(12) United States Patent
Yates, Jr.

(10) Patent No.: US 8,784,567 B1
(45) Date of Patent: *Jul. 22, 2014

(54) PROCESS FOR DECONTAMINATING OIL BOOM

(71) Applicant: William G. Yates, Jr., Philadelphia, MS (US)

(72) Inventor: William G. Yates, Jr., Philadelphia, MS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/905,956

(22) Filed: May 30, 2013

Related U.S. Application Data

(60) Division of application No. 13/569,058, filed on Aug. 7, 2012, now Pat. No. 8,475,601, which is a continuation of application No. 13/191,290, filed on Jul. 26, 2011, now Pat. No. 8,261,756.

(60) Provisional application No. 61/369,950, filed on Aug. 2, 2010.

(51) Int. Cl.
*B08B 1/02* (2006.01)
*B08B 3/02* (2006.01)

(52) U.S. Cl.
CPC ...................................... *B08B 3/022* (2013.01)
USPC ..................... 134/15; 134/26; 134/34; 134/42

(58) Field of Classification Search
USPC ............... 134/15, 26, 32, 34, 40, 42
See application file for complete search history.

(56) References Cited

U.S. PATENT DOCUMENTS

| 2,545,890 | A |   | 3/1951 | McKneely |
|---|---|---|---|---|
| 3,556,049 | A | * | 1/1971 | Hidden et al. ................ 118/72 |
| 3,734,109 | A | * | 5/1973 | Hebner ...................... 134/64 R |
| 4,049,170 | A |   | 9/1977 | Kawakami et al. |
| 4,477,348 | A |   | 10/1984 | Ayers et al. |
| 4,741,798 | A | * | 5/1988 | Haas ............................... 216/86 |
| 5,197,916 | A | * | 3/1993 | Orlando et al. ............... 452/125 |
| 5,569,331 | A |   | 10/1996 | Barber, III |
| 5,601,659 | A |   | 2/1997 | Rohrbacher |
| 6,347,637 | B1 | * | 2/2002 | Musha et al. ............... 134/64 R |
| 6,592,681 | B1 | * | 7/2003 | Hackett .......................... 134/32 |
| 6,810,548 | B2 | * | 11/2004 | Yoshioka et al. ................ 15/77 |
| 8,475,601 | B1 | * | 7/2013 | Yates, Jr. ....................... 134/15 |

FOREIGN PATENT DOCUMENTS

| CN | 201495993 | 2/2009 |
|---|---|---|
| KR | WO0201055997 | 9/2009 |
| RU | 2380398 | 4/2008 |

OTHER PUBLICATIONS

Unknown, "Continuous Conveyor Wash" Chilton's Food Engineering: Radnor: Apr. 1998, vol. 70, Issue 4; p. 51.

Unknown, "Bulk Oil Storage System" Diesel Progress North American Edition; 74.5 (2008): 63.

* cited by examiner

*Primary Examiner* — Saeed T Chaudhry
(74) *Attorney, Agent, or Firm* — Bradley Arant Boult Cummings LLP

(57) ABSTRACT

A rapid and effective means for decontaminating fouled oil-control booms is provided. The process involves washing the boom with pressured washing fluid, reorienting the boom to facilitate full inspection, and drying the boom. This can be performed in an assembly-line manner, using one or more conveyors to transport the boom sequentially to a washing area, an inspection area, and a drying area. Consequently, contaminated oil-control booms can be cleaned and redeployed rapidly and inexpensively during an oil release accident.

14 Claims, 4 Drawing Sheets

PROCESS FOR DECONTAMINATING OIL BOOM

CROSS-REFERENCE TO RELATED APPLICATIONS

This application is a divisional application under 35 U.S.C. §120 of co-pending U.S. patent application Ser. No. 13/569,058, filed on Aug. 7, 2012. U.S. patent application Ser. No. 13/569,058 is a continuation under 35 U.S.C. §120 of U.S. application Ser. No. 13/191,290, filed Jul. 26, 2011, which is now U.S. Pat. No. 8,261,756. U.S. Pat. No. 8,261,756 cites the benefit under 35 U.S.C. §119(e) of U.S. application Ser. No. 61/369,950, filed on Aug. 2, 2010. The contents of all of the foregoing patent applications are incorporated herein by reference in their entireties.

BACKGROUND

When petroleum or petroleum products (sometimes generically referred to as "oil") spills in a body of water, the oil will generally collect on the surface of the water due to its buoyancy and immiscibility with water. Floating oil poses numerous environmental hazards. Watercraft cannot traverse the slick unless specifically equipped to do so; otherwise they risk damage to the craft, ignition of the slick, or spreading the slick. Consequently, oil spills can restrict or eliminate recreational and commercial boating and shipping. In extreme cases, an oil spill can close an entire port. Oil is toxic to most marine life, including fish, mammals, turtles, and sea birds. These creatures are often either commercially valuable, at risk of extinction, or both. Oil is also toxic and carcinogenic to humans. An oil slick can make water inhospitable to swimmers, render seafood inedible, and can render beaches unpleasant or dangerous to recreational and commercial use. Oil is also toxic to terrestrial plants and animals which can be exposed at the shoreline. Marshes and swamps can be particularly impacted by oil spills. Because such wetlands serve to reduce flooding and serve as hatcheries for valuable aquatic and marine species, their destruction by oil spills is of specific concern. An oil spill can therefore cause entire communities and industries to suffer economic disruption.

Once the oil has formed a slick on the surface, it will move in response to tide, current or winds. Floating oil slowly absorbs water and debris, which increases the oil's bulk density. The lighter components of the oil evaporate (creating noxious fumes), while the heavier components remain. These processes cause the oil to lose is buoyancy, and sink. Once the oil sinks, it still retains its toxic properties. However, oil is very difficult to collect or degrade once it is no longer on the surface of the water. As a result, efforts to remediate oil spills focus on containing and treating the spill while it is still on the surface. This is usually done by removing the oil with hoses and skimmers. Oil will also naturally degrade due to the metabolism of bacteria, but this occurs much more slowly if the oil sinks, due to lower concentrations of oxygen at greater depths.

Traditionally oil is contained, or its movement slowed, by the placement of floating booms. The boom forms a barrier on the surface of the water to a certain depth. The slick can thus be prevented from spreading to the opposite side of the boom. Containment of the oil in this manner facilitates clean-up of the contaminated water and aquatic environment in general. Oil booms also are used to stop patches of oil from impacting coastal areas, or migrating into areas in which strong currents could further transport the slick.

The crude oil that oil booms are used to contain is often a heavy, sticky material. When oil weathers on the surface of water, it can form emulsions with foamy or gelatinous texture (when water is suspended in oil, this is known as "mousse"). As a result, oil booms that have been deployed become contaminated with oil and debris. Oil booms also may become fouled with barnacles, algae, or other organisms. Consequently, an oil boom may need to be cleaned or decontaminated before being stored or redeployed.

Currently there is no effective way to decontaminate oil booms. Typically, workers manually scrape and scrub the boom. This process is manually intensive, slow, and expensive. It has the potential to expose workers to toxic and carcinogenic oil components, and can yield inconsistent results.

Thus, there exists a need for a way to effectively, quickly, safely, and cost effectively decontaminate oil booms.

SUMMARY

The above needs are addressed by various embodiments of the processes, machines, manufactures, and compositions of matter of the present disclosure (although not all such needs are addressed by every embodiment in this disclosure). All descriptions in this disclosure are intended to be non-limiting unless explicitly stated otherwise. Consistent with this intention, the term "including" should be construed to mean "including but not limited to." Unless otherwise stated, references to the singular should be construed to encompass the plural, and vice versa.

An apparatus for removing residual oil from an oil containment boom is provided, said apparatus comprising a first translocation means configured to receive the boom and positioned to translocate the boom to a washing means; a washing means comprising a support means and a cleaning means, the support means configured to stably support the boom, the cleaning means configured to contact the boom with a wash solution; a second translocation means configured to receive the boom and positioned to convey the boom from the washing means to a rotation means; and a rotation means configured to rotate (flip) the boom by about 180° to allow visual inspection and/or further cleaning of the boom.

Also provided is an apparatus for removing residual oil from an oil containment boom, said apparatus comprising a first conveyance configured to receive the boom and positioned to convey the boom to a wash table (optionally by way of a presoaking area); a wash table comprising a roller bed assembly and a spray manifold; the roller bed assembly comprising two parallel roller beds inclined downwardly toward one another; the spray manifold comprising a plurality of spray heads; a second conveyance configured to receive the boom and positioned to convey the boom from the wash table to a first inspection area; a third conveyance parallel to the second conveyance and positioned next to the second conveyance for a distance at least as long as the boom, the third conveyance positioned to convey the boom to a drying area; and a drying area comprising a blower positioned to direct a current of air onto the boom.

Methods of removing residual oil from an oil containment boom are provided, comprising processing the oil containment boom with any of the apparatuses provided.

Further provided is a process for removing residual oil from an oil containment boom comprising loading the boom onto a conveyance configured to receive and support such a boom; contacting at least a portion of the boom with a high-pressure spray of cleaning solution; translocating the boom to an inspection area; and reorienting the boom to reveal substantially all sides of the boom to inspection.

BRIEF DESCRIPTION OF THE DRAWINGS

The processes, machines, manufactures, and compositions of matter of the present disclosure will be explained, by way of example only, with reference to certain embodiments and the attached Figures, in which.

DETAILED DESCRIPTION

Figure 1:
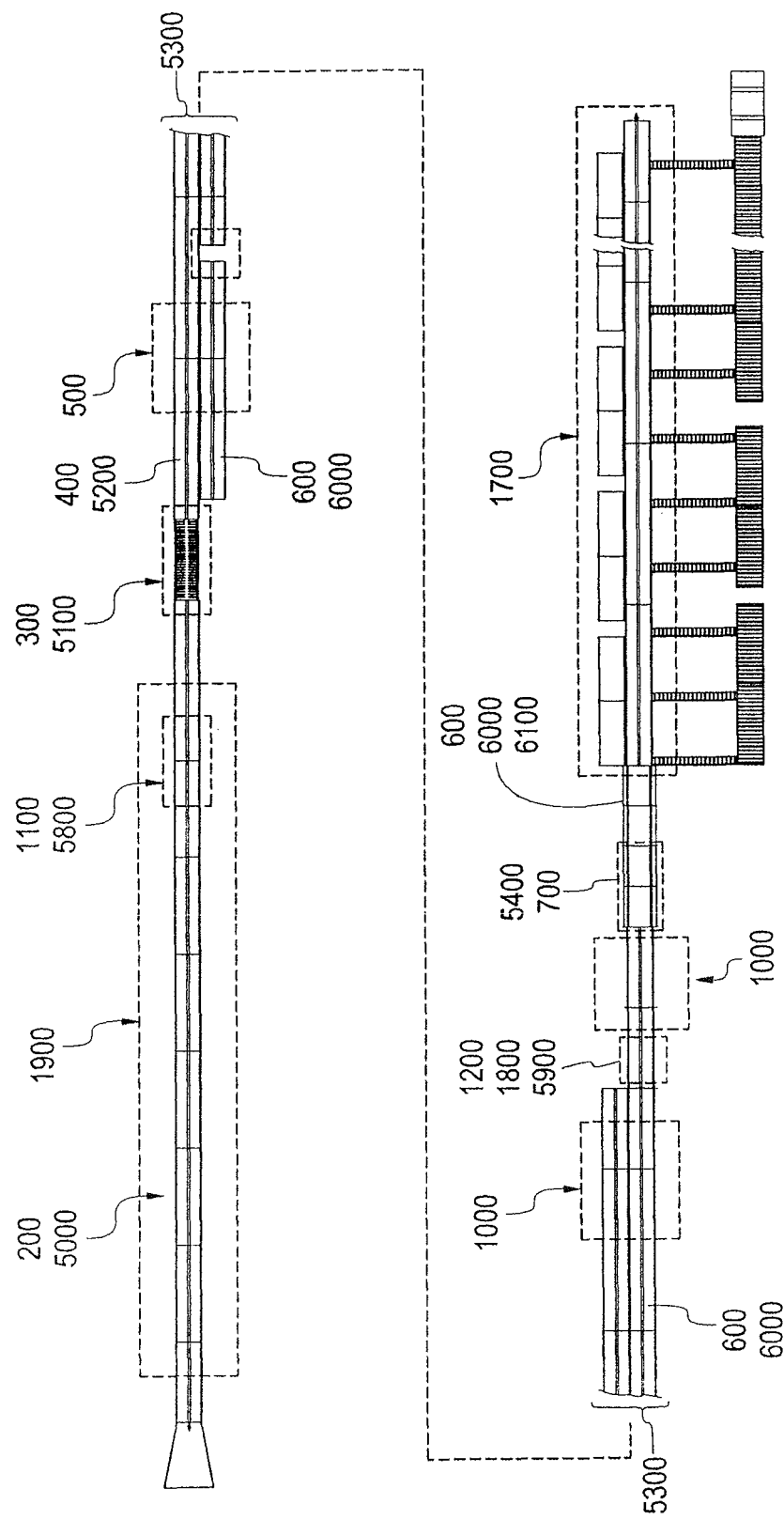
FIG. 1 is a plan view of an exemplary embodiment of the disclosed process and apparatus.
Figure 2:
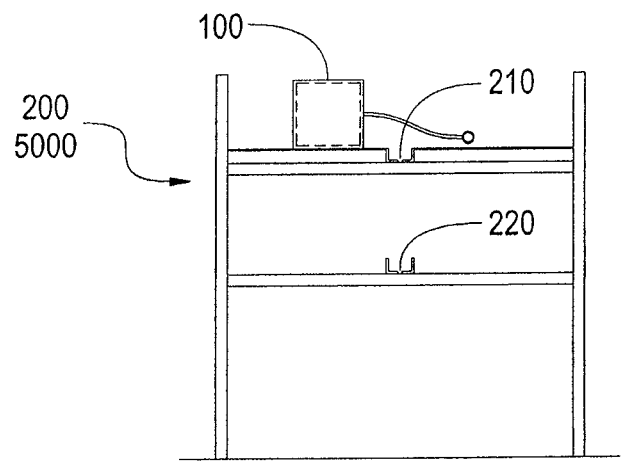
FIG. 2 is a sectional view of the pre-wash stage of the embodiment.

I. Apparatus for Removing Residual Oil from an Oil Containment Boom

An apparatus is provided for removing residual oil from an oil containment boom 100. A general embodiment of the apparatus comprises a first translocation means 5000 configured to receive the boom 100 and positioned to translocate the boom 100 to a washing means 5100; a washing means 5100 comprising a support means 5110 and a cleaning means 5120, the support means 5110 configured to stably support the boom 100, the cleaning means 5120 configured to contact the boom 100 with a wash solution; a second translocation means 5200 configured to receive the boom 100 and positioned to convey the boom 100 from the washing means 5100 to a rotation means 5300; a rotation means 5300 configured to rotate the boom 100 by about 180° to allow visual inspection of the boom 100; and a drying means 5400.

The first translocation means 5000 is any such means that is suitable to support and transport the boom. A specific embodiment of the translocation means 5000 is a chain conveyor 210 to which the boom is secured. The chain 210 pulls the boom 100 to the washing means 5100. The chain 210 may be in the form of an endless chain; the endless chain is a loop of chain comprising a chain-return 220, and which may be driven by a rotating sprocket. Additional sprockets, pulleys, or rollers may be positioned to define the path of the endless chain, as is understood in the art. The first translocation means 5000 may be a conveyor system; a conveyor belt; a series of horizontal rollers closely spaced, some of which are turned by power in the direction of motion; or any other suitable conveyor that is known in the art.

The washing means 5100 is configured to effectively remove at least a substantial portion of oil, debris, or fouling organisms from the boom 100. The washing means 5100 employs a washing fluid for this purpose. Removal of unwanted material from the boom 100 may be achieved, for example, by the use of high pressure, surfactants, detergents, elevated temperature, chemical reagents, solvents, or a combination of any of the foregoing. Some embodiments of the washing means 5100 include a spray means 5130, such as a spray head or nozzle 313. Some embodiment of the washing means 5100 comprise a wash table 300. In an exemplary embodiment, the wash table 300 comprises a roller bed assembly 310 and a spray manifold 312. The roller bed assembly 310 supports the boom 100 during the washing process. The roller bed assembly 310 may comprise two generally parallel roller beds 311 *a* & *b* 311 *b* inclined downwardly toward one another. Such embodiments have the advantage of supporting the boom 100 stably around the middle of the roller bed assembly 310 while still allowing the boom 100 to move freely in the direction of the first translocation means 5000. The inclination of the roller beds 311 also facilitates drainage of used washing fluid. The spray manifold 312 may comprise a spray head 313; in many embodiments the spray manifold 312 will comprise multiple spray heads 313. In further embodiments the manifold 312 comprises spray heads 313 positioned to expose all surfaces of the boom 100 to the sprayed fluid. Turbo tips within the spray heads 313 may rotate, oscillate, or both, to increase the arc of coverage of each spray head 313.

Some embodiments of the apparatus comprise a pre-soaking means 5800 configured to receive the boom 100 prior to the washing means 5100. The pre-soaking means 5800 may be any known to be suitable in the art. In one exemplary embodiment the pre-soaking means 5800 is a pre-soak manifold 1100 configured to spray a suitable pre-soaking fluid. An example of a suitable pre-soaking fluid is a solution of water and a biodegradable detergent.

The second translocation means 5200 may be, for example, a conveyor. Any conveyor described as suitable as the first translocation means 5000 may be used as the second translocation means 5200. The second translocation means 5200 is positioned to receive the boom 100 from the washing means 5100. In some embodiments, the second translocation means is the same structure of the first translocation means (for example, if the first translocation means extends through the washing means). The second translocation means 5200 may accept the boom 100 directly from the washing means 5100, or there may be an intervening structure. Likewise, the second translocation means 5200 may convey the boom 100 directly to the rotation means 5300, or it may do so via another intervening structure. Embodiments in which the second translocation means 5200 directly receives the boom 100 from the washing means 5100 and directly conveys the boom 100 to the rotation means 5300 have the advantage of simplicity.

In some embodiments of the apparatus, the second translocation means 5200 will be adjacent to a third translocation means 6000 for a portion of its length to facilitate transfer of the boom 100 from the second translocation means 5200 to the third translocation means 6000. In particular, embodiments comprising a third translocation means 6000, the second and third translocation means 5200 & 6000 will be approximately parallel to one another and adjacent to one another for at least a portion of each of their lengths. In such embodiments the boom 100 may be easily transferred from one to another. In a specific embodiment the second and third translocation means 5200 & 6000 are immediately adjacent to one another and parallel to one another over a distance that is at least the length of a typical boom 100. This embodiment has the advantage of facilitating the transfer of the boom 100 by simply flipping the boom 100 from the second to the third translocation means 5200 & 6000; in the process the orientation of the boom 100 will be changed sufficiently to allow an observer during the transfer to visually inspect all sides of the boom 100, which is an additional advantage of such embodiments.

In those embodiments of the apparatus in which the boom 100 is flipped from the second to the third translocation means 5200 & 6000, the area in which the transfer occurs will also be the rotation means 5300. In such embodiments the rotation means 5300 is also a first inspection area 500, as the boom 100 can be inspected on all sides post-washing in the process of transferring the boom 100 from one translocation means 5200 & 6000 to another. In other embodiments these functions may be discrete or performed by separate structures.

The third translocation means 6000 may be configured to receive the boom 100 from the rotation means 5300 and convey the boom 100 to the drying means 5400. The third translocation means 6000 may be any translocation means that is suitable as the first or second translocation means 5000 & 5200. In some embodiments the third translocation means 6000 is configured to convey the boom 100 to a rinsing means 5900 prior to the drying means 5400. The rinsing means 5900 may comprise a water spray 1600 and a rinse-catch basin 1300. In one embodiment the water spray 1600 comprises a high pressure wash rinse manifold 1200 having one or more spray nozzles 313. The rinsing means 5900 functions to remove any residual cleaning fluid. Some embodiments of the rinsing means 5900 may further comprise a rinse-catch basin 1300 to collect any runoff produced during rinsing.

The drying means 5400 functions to remove excess washing fluid, residual oil, or both. The drying means 5400 may be any suitable drying means known in the art. Some embodiments of the drying means 5400 comprise a blower 710. The blower 710 is configured to provide a current of gas (such as air) to the boom 100. The current of gas may be at a controlled temperature, or it may be at ambient temperature. The temperature of the gas will preferably be in a range that will effectively evaporate the washing fluid, a component of the residual oil, or both, and which will not damage the boom 100. Some embodiments of the drying means 5400 comprise a heater 720. The heater 720 may be any suitable heater known in the art. In a specific embodiment, the heater 720 is a radiant heater, such as a heat lamp 721. Multiple drying means 5400 may be employed side-by-side, such as a blower 710 and a heater 720.

In some embodiments of the apparatus a fourth translocation means 6100 is configured to convey the boom 100 from the drying means 5400 to an offloading area 1700. The fourth translocation means 6100 may in fact simply be an extension of the third translocation means 6000, or it may be a distinct structure. The fourth translocation means 6100 may be any translocation means that is disclosed as a suitable translocation means in this disclosure. In a particular embodiment the fourth translocation means 6100 is a roller bed. In some embodiments, the third translocation means 6000 is configured to convey the boom 100 to the offloading area 1700.

Some embodiments of the apparatus further comprise a fluid capture means 5500 positioned to capture at least a portion of the used wash solution. The fluid capture means 5500 may be any type of basin 801, pan, drain, funnel, siphon, hose, reservoir, or other means known in the art. A particular embodiment of the fluid capture means 5500 is a catch basin 801. Another embodiment of the fluid capture means 5500 is a liner 802. Embodiments of the apparatus comprising a fluid capture means 5500 have the advantage of preventing the escape of oil into the environment around the apparatus. Such embodiments also have the advantage of allowing the captured fluid to be treated, reused, or disposed of in a controlled manner. In many embodiments the fluid capture means 5500 will be specifically configured to recover fluid from the washing means 5100; in some such embodiments the fluid capture means 5500 may be integral to the washing means 5100.

Some embodiments of the apparatus further comprise a separation means 5700 configured to separate an oil fraction and an aqueous fraction from the used washing solution. Any suitable oil/water separators 1400 known in the art may be used. These may include a two-phase centrifuge, a three-phase centrifuge, a liquid vortex, a settling tank, an API oil/water separator, a parallel plate separator, a skimmer tank, or a filter. Multiple separation means 5700 may be used in succession to improve the quality of separation. Separation may be enhanced by the use of demulsifiers when the aqueous and oil phases are emulsified. The separation means 5700 may be configured to receive fluid from the fluid capture means 5500.

Some embodiments of the apparatus further comprise a fluid pressurization means 5600 configured to deliver pressurized washing solution to the washing means 5100. The fluid pressurization means 5600 may be, for example, a pump. The pump may be any suitable high-pressure pump known in the art. The pressurized washing solution may be stored in a pressurized tank prior to delivery to the washing means 5100.

In some embodiments of the apparatus the first translocation means 5000 may be set up to allow pre-washing procedures to be performed on the boom 100. For example, the boom 100 may be misted with detergents or emulsifiers prior to washing. As another example, workers might scrape large debris from the boom 100 prior to washing. As another example, workers might use brushes to pre-wash the boom 100 prior to washing; in such embodiments the fluid capture means 5500 may be configured to capture fluid produced by the pre-washing.

In some embodiments of the apparatus the second translocation means 5200 may be set up to allow preliminary inspection or post-washing of the boom 100. In such embodiments the second translocation means 5200 will be accessible to observers or a visual recording or transmission device to allow an assessment of the effectiveness of the wash. If substantial amounts of oil are still present on the boom 100, the boom 100 could, for example, be removed at this point and routed back through the washing means 5100. If a small amount of oil is still present, it may be removed manually. If the second translocation means 5200 is set up to allow post-washing, the fluid capture means 5500 may be configured to receive fluid runoff that is produced by the post-washing. In such embodiments one region of the second translocation means 5200 may be designated as a second inspection area 1000.

II. Process for Removing Residual Oil from an Oil Containment Boom

A process for removing residual oil from an oil containment boom 100 is also provided. The process may comprise, for example, processing the oil containment boom 100 in any of the apparatuses disclosed herein.

A general embodiment of the process comprises: loading the boom 100 onto a conveyance 200 configured to receive and support such a boom 100; contacting at least a portion of the boom 100 with a high-pressure spray of washing fluid; translocating the boom 100 to a first inspection area 500; and reorienting the boom 100 to reveal substantially all sides of the boom 100 to inspection. Some embodiments of the process comprise pre-soaking the boom 100 prior to contacting the boom 100 with the washing fluid.

In a specific embodiment of the process, the steps described above are performed in chronological order, and the process consists essentially of those four steps.

The conveyance 200 employed in the process may be any conveyance that is suitable in the apparatus as described above. The method may employ multiple structures or multiple conveyances to transport the boom 100.

The boom 100 is contacted with a high-pressure spray of washing fluid; this functions to remove unwanted materials (such as oil, debris, and organisms) from the boom 100. The washing fluid may for example include a wide variety of fluids, including aqueous solutions, hydrophobic solvents, or suspensions. In some embodiments the "fluid" could conceivably be a gas, such as steam. In a specific embodiment the fluid is an aqueous liquid. Examples include water with or without additional solutes. Useful solutes to remove oil are known in the art, and include detergents, soaps, emulsifiers, dispersants, and surfactants. The fluid may be heated to elevated temperature to further facilitate oil removal. The elevated temperature in some embodiments will be below the point at which the boom 100 will be damaged, but sufficiently high to increase the rate of oil removal (through dissolution in the fluid or emulsification, for example).

In some embodiments of the process the portion of the boom 100 is contacted with the fluid by transferring the boom 100 to a roller bed assembly 310 comprising two parallel roller beds 311 inclined downwardly toward one another, and projecting the fluid through a plurality of spray heads 313. In more specific embodiments the spray heads 313 are mounted on a spray manifold 312. In some such embodiments the spray heads 313 will be mounted on the manifold 312 in a configuration to expose all surfaces of the boom 100 to the spray. An exemplary configuration is a plurality of spray heads 313 spaced approximately evenly around the inner surface of an annular manifold 312; during washing the manifold 312 encircles the boom 100. In such an embodiment, the individual rollers should be spaced sufficiently to allow the spray from the spray heads 313 to pass between adjacent rollers and contact the exposed surface of the boom 100. The parallel roller beds 311 may be inclined toward one another sufficiently to keep the boom 100 stably situated toward the middle of the two roller beds 311 and to channelize the flow of used fluid.

Reorienting the boom 100 may comprise rolling the boom 100 from the conveyance to a second conveyance 400. When the boom 100 is rolled from one conveyance to another, substantially every surface of the boom 100 will be exposed for inspection, allowing an observer to determine whether the boom 100 has been adequately cleaned. Based on such an inspection, the boom 100 may be returned to the washing area or further cleaned by other means.

Some embodiments of the process comprise translocating the boom 100 to an area dedicated to washing prior to contacting the boom 100 with the washing fluid. Such an area may be the washing means 5100 as described above. In a similar vein some embodiments of the process comprise translocating the boom 100 to the drying area 700 (for example, from the first inspection area 500). Further embodiments comprise translocating the boom 100 to an offloading area 1700 (for example, from a drying area 700).

Various embodiments of the process comprise inspecting the boom 100. The inspection may occur prior to washing, following washing, or both. Inspection may be performed directly by an observer, via a visual recording or transmission device (such as a camera), or using another optical device as known in the art.

A pre-wash (or pre-soak) step may be performed, in which oil or debris is removed with manual cleaning tools. In embodiments of the process including a pre-wash step, the pre-wash step may be performed as a matter of course, or it may be performed solely based on the results of a pre-wash inspection as described above. For example, a pre-wash inspection may be performed to detect debris particles that are sufficiently large that they will not be removed by contact with the washing fluid; if such large debris is detected, it may be simply removed using a rake. In an alternative embodiment the pre-wash step may comprise spraying the boom 100 with a solution of water and biodegradable detergent. In certain embodiments the pre-wash spraying (pre-soak) may be accomplished with a pre-soak manifold 1500.

A post-wash step may be performed, in which residual oil or debris is removed from the boom 100 after washing. Under conditions in which the cleaning solution is highly effective any post-wash step will be a "touch-up" to eliminate tiny amounts of residue. However, under more difficult conditions the post-wash may be instrumental to remove substantial amounts of oil or debris. The post-wash step may be performed pursuant to an inspection step, in which the post-wash is performed only if inspection reveals oil or debris in need of removal.

The process may further comprise a rinsing step to remove residual washing fluid, residual oil, or both. The rinsing step may comprise spraying a high-pressure rinsing solution onto the boom 100; it may further comprise capturing the runoff created by the spray. The rinsing solution may be, for example, water. The rinsing step may involve the use of any suitable rinsing means 5900 described herein.

Some embodiments of the process further comprise capturing at least a portion of the used washing fluid without discharging the used washing fluid to the environment. The used washing fluid will in most cases comprise oil, debris, or both in various amounts (a "runoff mixture"). Consequently the runoff mixture must either be deposited at a special disposal site or treated. Treatment may comprise separating an aqueous washing fluid fraction from a hydrophobic oil fraction. Separating the two phases has the advantage of reducing the volume of oily waste and generating an aqueous fraction that may be reused or discarded without special precautions. In some embodiments of the process the hydrophobic oil fraction will be fit for reuse. In some embodiments the water content of the hydrophobic oil fraction may be sufficiently low that it can be reused as fuel; boiler fuel oil, for example, may contain a relatively large concentration of water. High water concentrations in the hydrophobic oil fraction have the advantage of requiring less vigorous separation. Low water concentrations in the hydrophobic oil fraction have the advantage of providing more energy when combusted as fuel. The process may comprise separating the aqueous and hydrophobic phases using any of the means and devices described as suitable as the separation means 5700 in the apparatus. Embodiments of the process that create a recycled cleaning fluid may further comprise reusing the recycled washing fluid in the process.

In embodiments comprising a pre-wash step, a post-wash step, or both, runoff mixture may be generated in a pre-wash area or the first inspection area 500. In such embodiments runoff mixture may be collected from these areas also.

Some embodiments of the process further comprise drying the boom 100. The boom 100 may be fit for reuse even if some residual moisture is present. In some embodiments this step may be as simple as exposing the boom 100 to ambient air, solar radiation, or both for a period of time sufficient to evaporate excess water. In further embodiments the boom 100 is subjected to elevated temperatures, reduced pressure, air currents, or both. Elevated temperatures may be provided by any suitable type of heater known in the art. In a specific embodiment, heat lamps are used to increase the rate of drying of the boom 100. Air currents may be provided by any suitable type of fan or blower 710 known in the art. The air may be desiccated before being blown on the boom 100, or it may be heated (or both). The pressure around the boom 100 may be reduced to increase the evaporation of any water or other volatile substances on the boom 100. Of course, any of these means may be used in combination with one another.

III. Exemplary Embodiment

One exemplary embodiment of the apparatus and process comprises a pre-wash stage, a wash stage, a drying stage, and an off-load stage. In some versions of this embodiment, an inspection and hand wash area 500 may follow the wash stage, and a shake-out area 1900 may precede the pre-wash stage. At least one conveyor 200 moves the oil boom 100 from the pre-wash stage through the off-load stage. In one version of the embodiment, and as explained below, a first conveyor 200 extends from the pre-wash stage through the first inspection area 500, and a second conveyor 400 begins at the first inspection area 500 and extends through the off-load area 1700. This permits the oil boom 100 to be flipped over from the first conveyor 200 to the second conveyor 400 for inspection. Each conveyor includes a transport mechanism to move the oil boom 100 through each stage.

In the exemplary embodiment, the conveyor includes a chain 210 recessed in a channel running the length of the conveyor 200. An oil boom 100 is attached to the chain 210 via a hook or other attachment mechanism. The chain 210 passes over sprockets at either end to form a continuous loop, with the chain return 220 under the conveyor 200. Any conventional motor can be used to turn the sprockets and drive the chain 210.

Stage 2 is the pre-wash stage. In the pre-wash stage of the exemplary embodiment, the oil boom 100 is loaded onto the conveyor 200 and stretched out in preparation for the wash stage.

Figure 3:
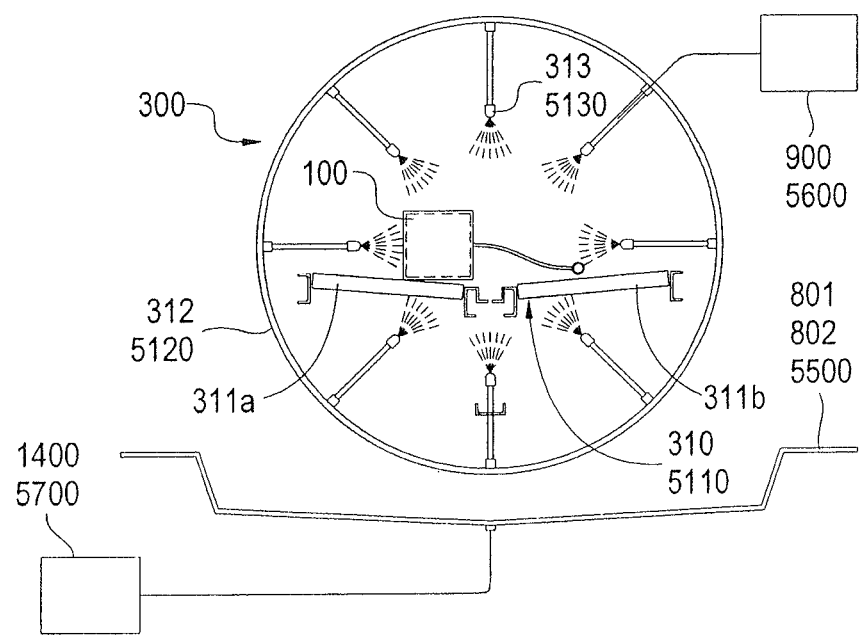
FIG. 3 is a sectional view of the wash stage of the embodiment.
Figure 4:
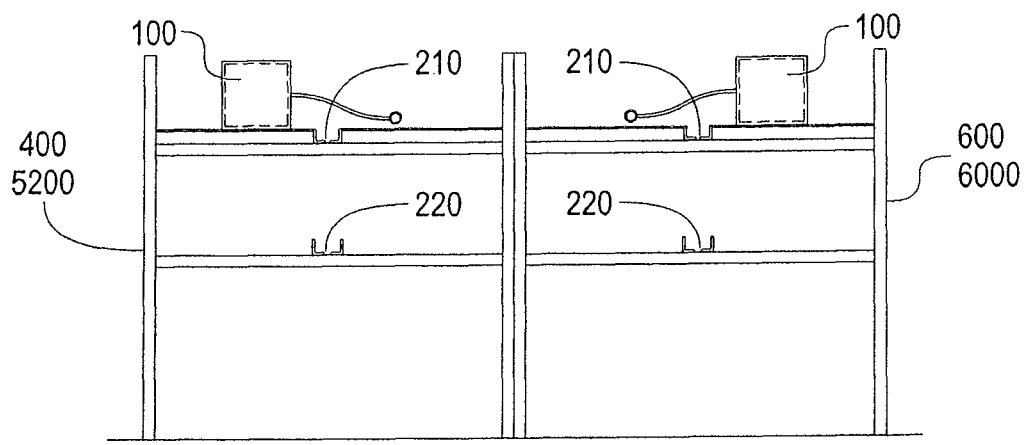
FIG. 4 is a sectional view of the inspection stage of the embodiment.
Figure 5:
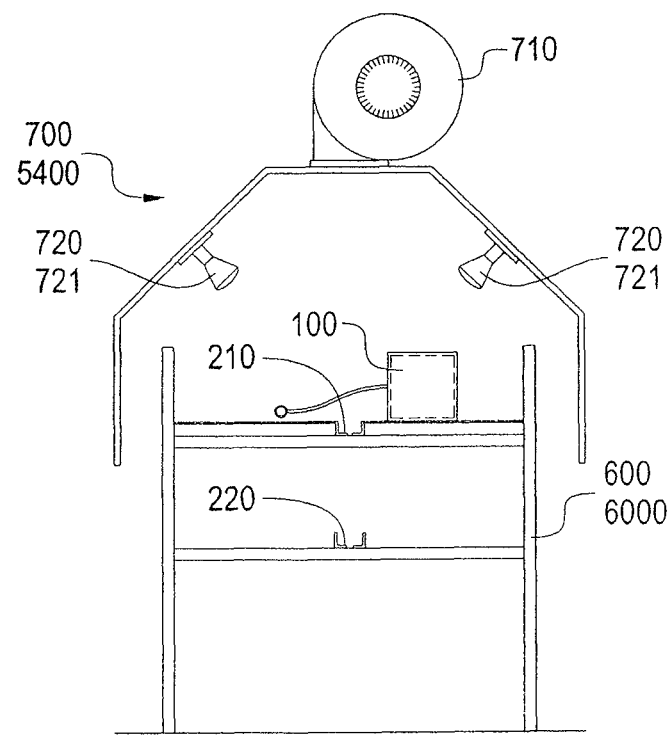
FIG. 5 is a sectional view of the drying stage of the embodiment.
Figure 6:
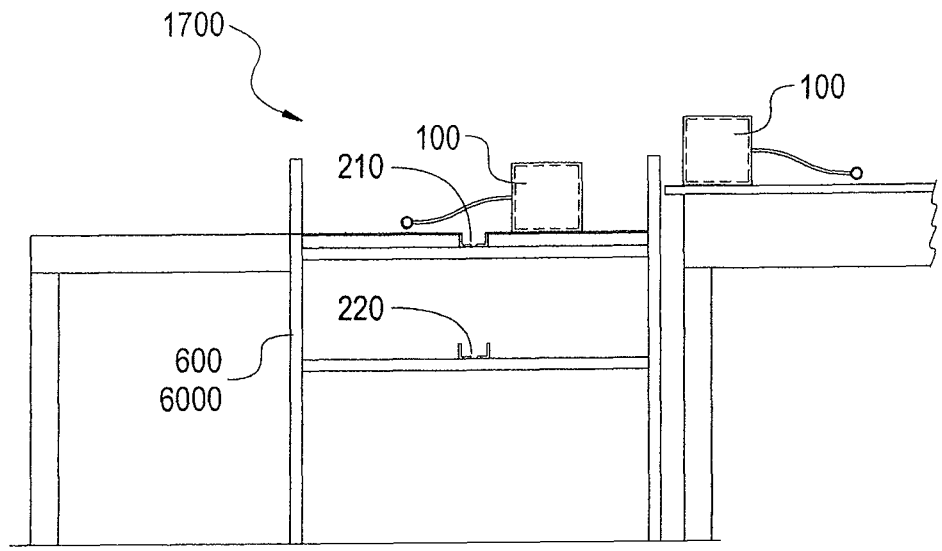
FIG. 6 is a sectional view of the offload stage of the embodiment.
Figure 7:
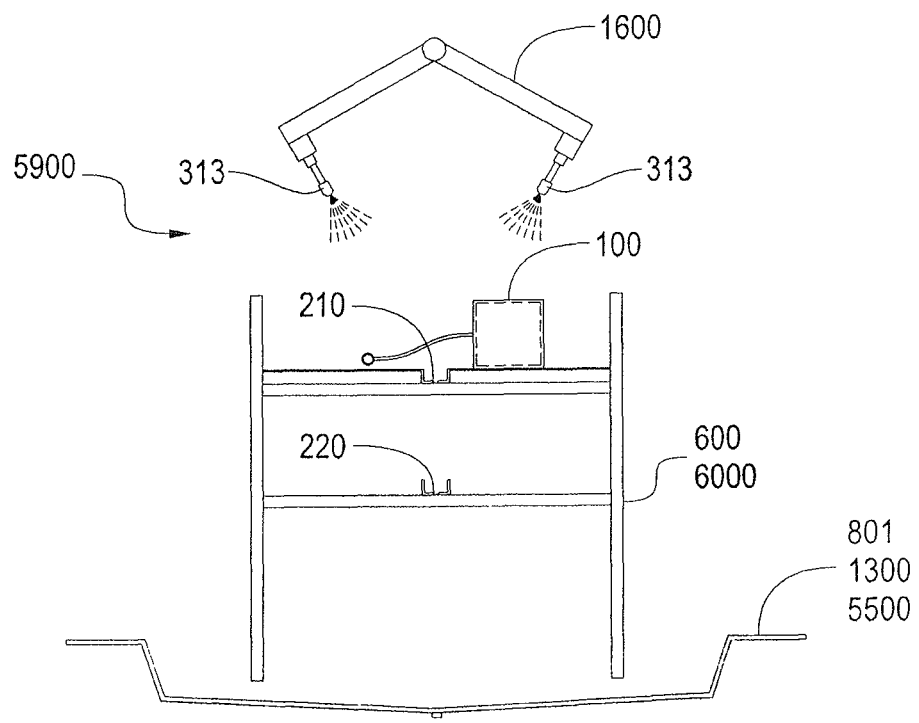
FIG. 7 is a sectional view of the rinse stage of the embodiment.

Stage 3 in the exemplary embodiment, as shown FIGS. 1 and 3, is the wash stage, in which the boom 100 is transported to a wash table 300. The wash table 300 includes at least one spray manifold 312 with a plurality of outlets, each preferably terminating in a nozzle or sprayer 313. A high pressure fluid source 900 is connected to the manifold 312, which may be in various configurations, such that a continuous high pressure spray of cleaning solution contacts the oil boom 100 and removes contaminants. In one version of the exemplary embodiment, the cleaning solution is water. Chemical additives and solvents may be mixed with the water to break up the contaminants and facilitate their removal. The number of outlets on the manifold 312 is sufficient to provide water coverage over the entire periphery of the oil boom 100. This in turn will depend on the type of nozzles 313 used and their spray coverage and pattern. In the exemplary embodiment, rotating nozzles 313 are utilized to increase the coverage area and cleansing effectiveness of the wash table 300. The oil boom 100 should pass through the wash table 300 in such a manner to allow water (or other cleaning solution) to contact the entire periphery of the oil boom 100. A roller conveyor is used, with spaces between the rollers that effectively suspend a small section of the oil boom 100 between the rollers to allow the water to reach the surfaces of the oil boom 100 that would otherwise be in contact with the conveyor. Alternatively, a larger section of the oil boom 100 may be suspended as it passes through the wash table 300 with other support mechanisms to allow water to reach all sides. The roller beds 311 of the conveyor may be inclined towards the center and at one end of the conveyor to facilitate flow and collection of the cleaning solution.

The area from the pre-wash stage through the drying area 700 includes a liner 802 or containment system underneath the conveyors to contain any water and oil. The wash stage 300 may optionally include an additional containment pan 801 underneath it. Both the pan 801 and the liner 802 areas trap the water and oil and transfer them to a water/oil separator 1400 which allows as much water as possible to be reused in the wash process and captures oil for proper disposal Following the wash stage, the oil boom 100, engaged by the transport mechanism, continues to the first inspection and touch-up area 500. At this stage, operators visually inspect the oil boom 100 for any contaminants that were not removed and remove them. A third conveyor 600, parallel to the first conveyor, begins at the inspection area 500 (in some embodiments the boom 100 is moved to a second conveyor 400 after the wash table 300, in which case the second conveyor 400 is parallel to the third conveyor 600). This allows the oil boom 100 to be flipped over to expose the surfaces that were down during the wash stage and inspected. The third conveyor 600 is also equipped with a transport mechanism, such as a chain 210 to move the oil boom 100 through the process. An optional wash stage may be inserted into this conveyor.

The oil boom 100 is moved to a rinsing area 1800, and then a drying area 700. The rinsing area 1800 in this embodiment involves subjecting the boom 100 to high-pressure water using high-pressure rinse manifolds 1600 comprising spray heads 313 and capturing the runoff in a rinse-catch basin 1300. One or more drying processes in a drying area 700 are utilized on the oil boom 100 to ready it for storage or transport. Drying area 700 may include heat lamps 721 and/or blowers 710, or a combination thereof. The boom 100 may be disconnected from the second conveyor 400 prior to being transported to the rinse area 1800 (for example by disengagement of a bus hook connected to a chain conveyor 210).

Finally, the decontaminated and dry oil boom 100 moves to the off-load area 1700. The oil boom 100 is disconnected from the chain 210, removed from the third conveyor 600, and stacked with other decontaminated oil booms 100 in a storage area. The oil booms 100 are now ready for redeployment or more permanent storage.

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and are capable of changes or modifications within the scope of the teachings as expressed herein, commensurate with the skill and/or knowledge of a person having ordinary skill in the relevant art. The embodiments described hereinabove are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein.

I claim:

1. A process for removing residual oil from an oil containment boom comprising:
   (a) loading the boom onto a first conveyance configured to receive and support the boom;
   (b) contacting at least a portion of the boom with a high-pressure spray of washing fluid;
   (c) translocating the boom to an inspection area; and
   (d) flipping the boom from the first conveyance to a second conveyance, wherein the second conveyance is parallel to the first conveyance for a distance at least as long as the boom, to reveal substantially all sides of the boom to inspection.

2. The process of claim 1 consisting essentially of steps (a)-(d).

3. The process of claim 1 wherein the boom is translocated to an area dedicated to washing prior to step (b).

4. The process of claim 1 wherein said portion of the boom is contacted with the fluid by transferring the boom to a roller bed assembly comprising two parallel roller beds inclined downwardly toward one another, and projecting the fluid through a plurality of spray heads.

5. The process of claim 1 comprising capturing at least a portion of the used washing fluid without discharging the used washing fluid to the environment.

6. The process of claim 5 comprising contacting the boom with blown air.

7. The process of claim 5 comprising translocating the boom from the inspection area to a drying area prior to drying the boom.

8. The process of claim 7, comprising separating the washing fluid from the oil in the runoff mixture, to create a recycled washing fluid.

9. The process of claim 1 comprising drying the boom.

10. The process of claim 1, wherein a runoff mixture is formed by at least a portion of the oil and at least a portion of the washing fluid, and the process comprises collecting the runoff mixture.

11. The process of claim 10, comprising reusing the recycled washing fluid in the process.

12. The process of claim 1, comprising translocating the boom to an offloading area.

13. The process of claim 1, comprising rinsing the boom after washing.

14. The process of claim 1, comprising pre-soaking the boom prior to washing.

* * * * *